United States Patent
Bradford

(10) Patent No.: US 10,337,370 B2
(45) Date of Patent: Jul. 2, 2019

(54) WATER SEPARATION DEVICE FOR ENGINE EXHAUST GAS

(71) Applicant: Tenneco Automotive Operating Company Inc., Lake Forest, IL (US)

(72) Inventor: Michael C. Bradford, Chelsea, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 76 days.

(21) Appl. No.: 15/648,748

(22) Filed: Jul. 13, 2017

(65) Prior Publication Data
US 2019/0017422 A1 Jan. 17, 2019

(51) Int. Cl.
| F01N 3/00 | (2006.01) |
| F01N 3/02 | (2006.01) |
| F01P 3/20 | (2006.01) |
| B01D 53/26 | (2006.01) |
| B01D 71/02 | (2006.01) |
| F01N 13/08 | (2010.01) |
| F02B 29/04 | (2006.01) |

(Continued)

(52) U.S. Cl.
CPC ........... *F01N 3/005* (2013.01); *B01D 53/268* (2013.01); *B01D 71/025* (2013.01); *B01D 71/027* (2013.01); *F01N 3/02* (2013.01); *F01N 3/0205* (2013.01); *F01N 13/08* (2013.01); *F01P 3/20* (2013.01); *F02B 29/04* (2013.01); *F02M 26/22* (2016.02); *F02M 35/10222* (2013.01); *F01N 2250/10* (2013.01)

(58) Field of Classification Search
USPC ......... 60/274, 275, 295, 297, 309, 310, 317, 60/324, 286, 301, 303; 55/327, 462, 55/434.2, 437
See application file for complete search history.

(56) References Cited

U.S. PATENT DOCUMENTS

| 3,511,031 A | 5/1970 | Ketteringham et al. |
| 4,725,359 A | 2/1988 | Ray |
| 4,871,495 A | 10/1989 | Helferich et al. |

(Continued)

FOREIGN PATENT DOCUMENTS

| DE | 19918591 A1 | 10/2000 |
| DE | 202007001447 U1 | 4/2007 |

(Continued)

OTHER PUBLICATIONS

M.Moses-Debusk, "Water Recovery form [sp] Gasoline Exhaust," U.S. Department of Energy, accessed via the World Wide Web on Jun. 24, 2015.

(Continued)

*Primary Examiner* — Binh Q Tran
(74) *Attorney, Agent, or Firm* — Bejin Bieneman PLC

(57) ABSTRACT

A system includes an engine and an exhaust conduit in communication with the engine. A water separation device has exhaust gas passageways in communication with the exhaust conduit. The water separation device has a substrate and a membrane on the substrate. The substrate is monolithic and extends around the exhaust gas passageways. The membrane is between the exhaust gas passageways and the substrate and has capillary condensation pores extending from the exhaust gas passageways to the substrate.

19 Claims, 9 Drawing Sheets

(51) Int. Cl.
*F02M 26/22* (2016.01)
*F02M 35/10* (2006.01)

(56) References Cited

U.S. PATENT DOCUMENTS

| | | | |
|---|---|---|---|
| 4,976,760 A | 12/1990 | Helferich et al. | |
| 5,655,212 A | 8/1997 | Sekhar et al. | |
| 6,804,949 B2* | 10/2004 | Andrews | C25B 15/08 |
| | | | 204/242 |
| 7,886,531 B2* | 2/2011 | Vachon | F01N 5/02 |
| | | | 55/282.5 |
| 8,511,072 B2* | 8/2013 | Judkins | B01D 53/002 |
| | | | 55/327 |
| 9,291,083 B2 | 3/2016 | Panziera | |
| 9,617,909 B2* | 4/2017 | Styles | F02B 29/0468 |
| 10,054,022 B2* | 8/2018 | Bradford | F01N 3/005 |
| 2005/0184009 A1 | 8/2005 | Jansen et al. | |
| 2011/0168128 A1* | 7/2011 | Bradley | F01N 3/005 |
| | | | 123/294 |
| 2013/0098314 A1* | 4/2013 | Imran | F02B 43/12 |
| | | | 123/3 |
| 2014/0020877 A1 | 1/2014 | Suzuki et al. | |
| 2015/0375169 A1 | 12/2015 | Youssef et al. | |
| 2017/0241317 A1 | 8/2017 | Bradford | |
| 2017/0342949 A1* | 11/2017 | Kikuchi | F02M 26/04 |

FOREIGN PATENT DOCUMENTS

| | | |
|---|---|---|
| JP | H05146617 A | 6/1993 |
| JP | 2015009212 A | 1/2015 |

OTHER PUBLICATIONS

R.J.Gorte et al., "Methane Oxidation on Pd@ZrO2/Si-Al2O3 is Enhanced by Surface Reduction of ZrO2," ACS Catalysis, 4 (2014) 3902-3909.
B.C. Gates, J.R. Katzer, and G.C.A. Schuit, "Chemistry of Catalytic Processes," McGraw-Hill, Inc., New York, 1979, pp. 49-54.
Günther et al., "Zeolite Membranes for Hydrogen and Water Separation under Harsh Conditions," Chemical Engineering Transactions, 32 (2013) 1963-1968.
B.Freeman, Y.Yampolskii, and I.Pinnau, "Materials Science of Membranes for Gas and Vapor Separation," 2006, pp. 6-9, John Wiley & Sons Ltd, England.

* cited by examiner

WATER SEPARATION DEVICE FOR ENGINE EXHAUST GAS

BACKGROUND

Separation of water vapor from a gas mixture, and subsequent condensation of the water vapor into liquid water, may be accomplished by capillary condensation. Capillary condensation may be carried out with the use of a module having a porous substrate coated with a porous membrane. The porous membrane is designed to foster capillary condensation of water vapor from gas flowing along the porous membrane. Specifically, the porous membrane may have pores sized to receive water vapor from gas flowing along the porous membrane. The pores are sized such that, when the water vapor is in one of pores of the porous membrane, the pores confine the water vapor molecules, which increases van der Waals interactions between the water vapor molecules to ultimately result in condensation of the water vapor to liquid water. The liquid water flows into the porous substrate, and may be removed from the porous substrate with application of a vacuum.

The extent to which capillary condensation occurs is dependent on the temperature of the membrane, as identified in the Kelvin equation. Specifically, the extent to which capillary condensation occurs decreases as the temperature of the membrane increases. In applications where an increase in water removal is required, the volume of the substrate may be increased. Such an increase in volume results in the increase in manufacturing cost and an increase in packaging constraints for the module. In addition, if the thermal conductivity of the substrate is too low, then the heat release from water condensation could increase the temperature of the enlarged substrate, and reduce the extent to which capillary condensation occurs, thereby reducing substrate water collection efficiency.

DETAILED DESCRIPTION

Figure 1:
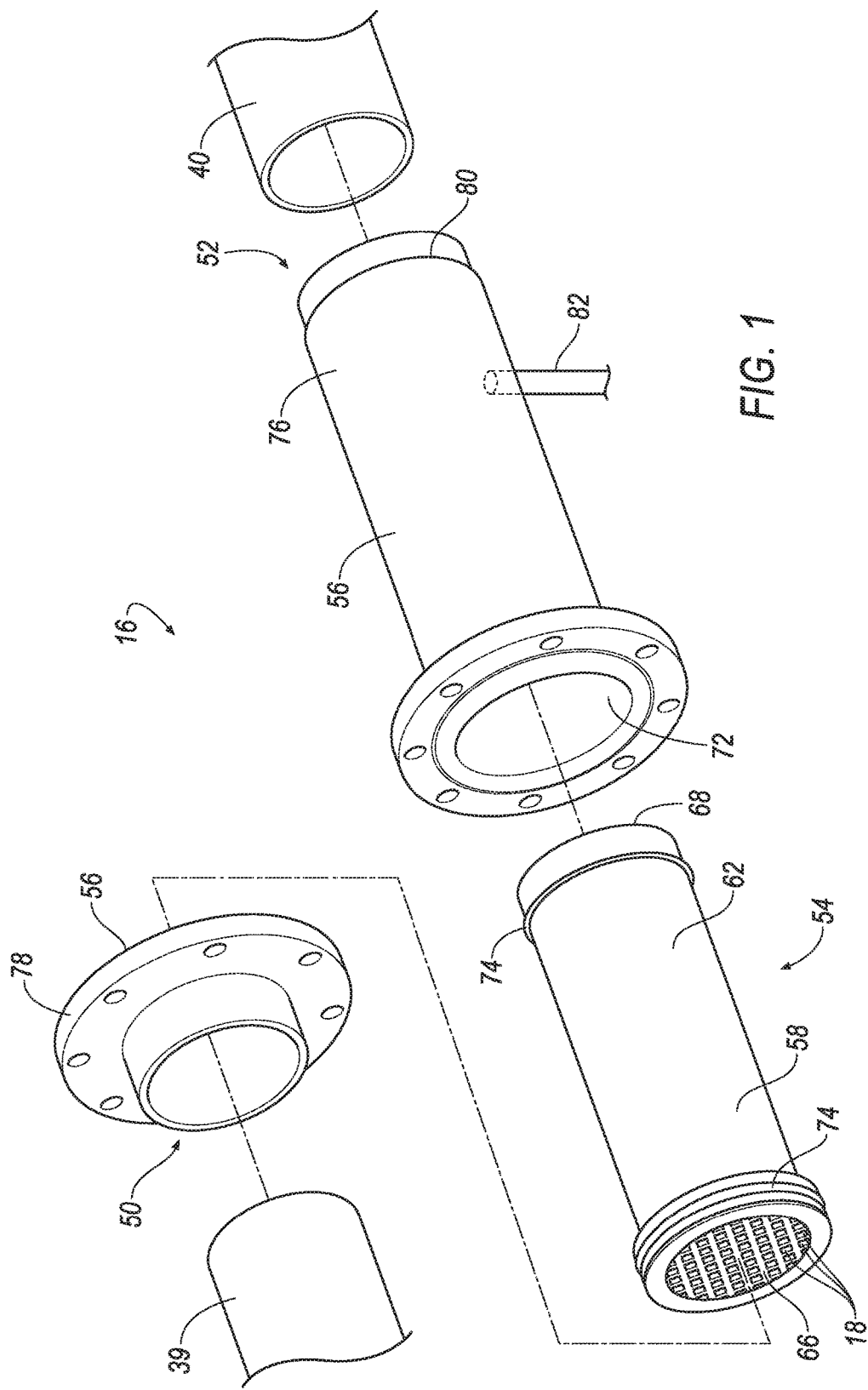
FIG. 1 is an exploded view of a water separation device.

With reference to the Figures, wherein like numerals indicate like parts throughout the several views, a system 10 includes an engine 12 and an exhaust conduit 14 in communication with the engine 12. With reference to FIGS. 1-11, a water separation device 16 has exhaust gas passageways 18 in communication with the exhaust conduit 14, specifically, either in direct communication with the exhaust conduit 14 or indirect communication with the exhaust conduit 14 through intermediate components. The water separation device 16 has a substrate 20 and a membrane 22 on the substrate 20. The substrate 20 is monolithic and extends around the exhaust gas passageways 18. The membrane 22 is between the exhaust gas passageways 18 and the substrate 20, and has capillary condensation pores 24 extending from the exhaust gas passageways 18 to the substrate 20.

Figure 6:
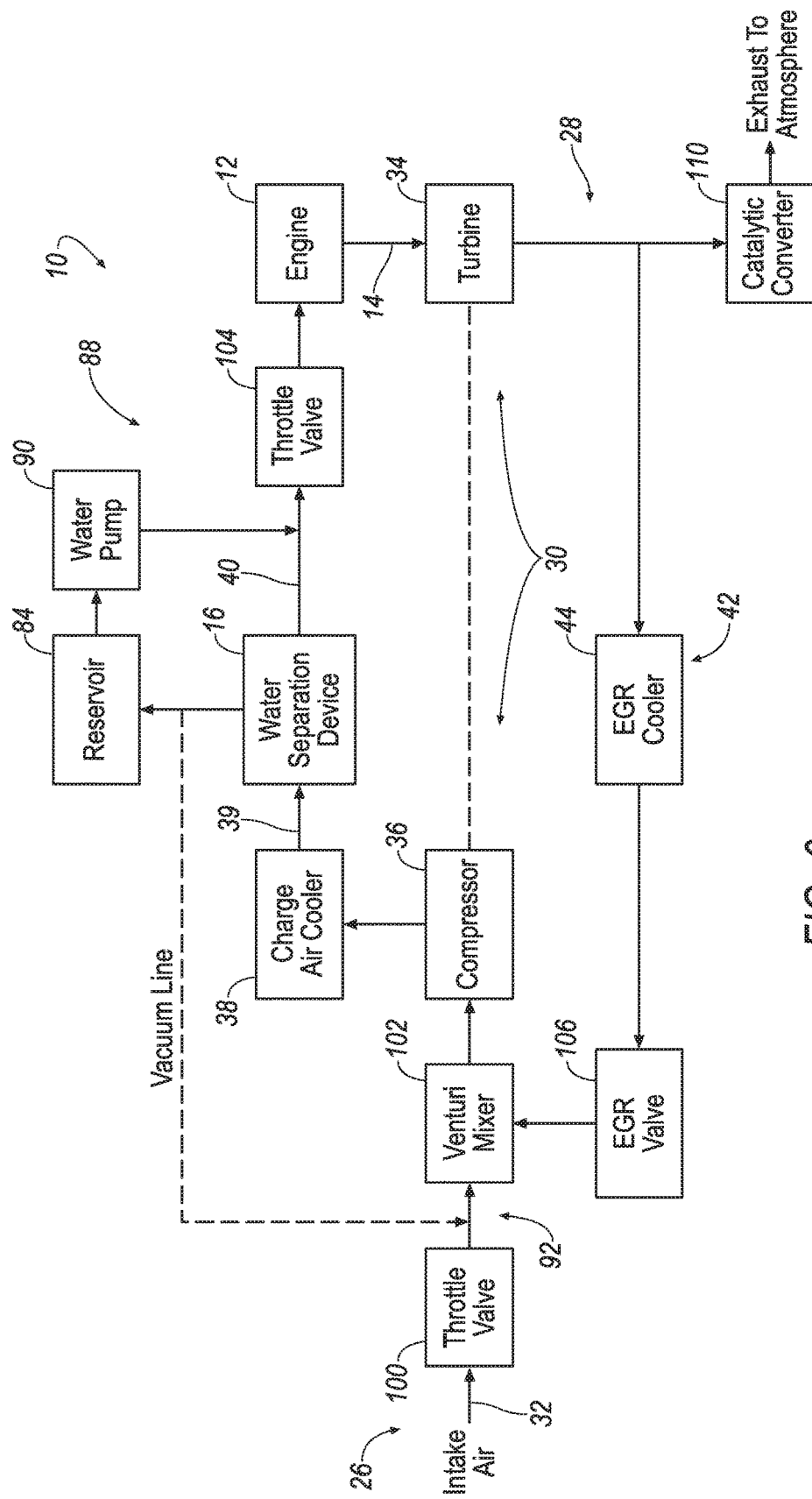
FIG. 6 is a schematic of an example system including the water separation device.
Figure 7:
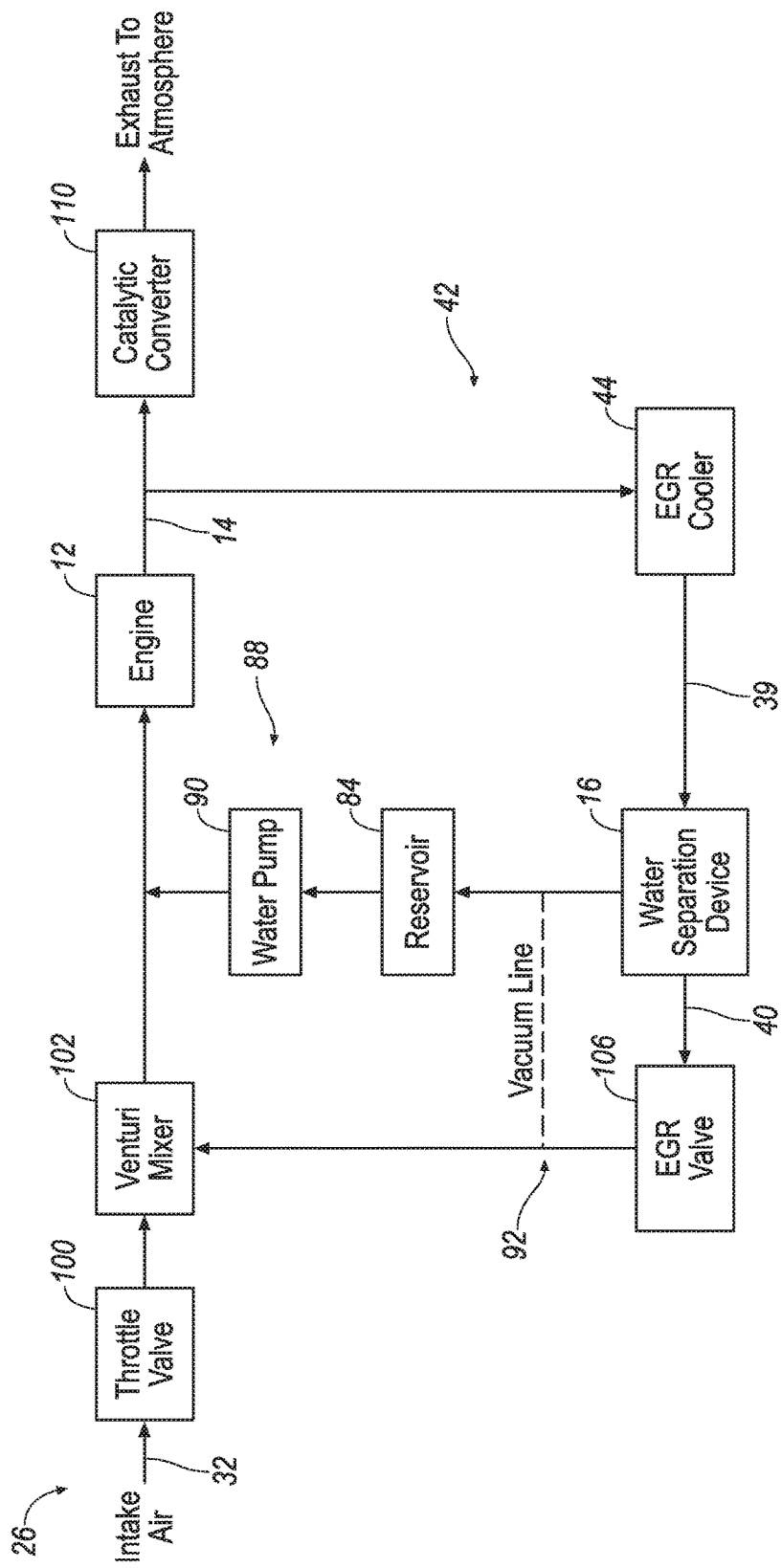
FIG. 7 is a schematic of another example system including the water separation device.
Figure 8:
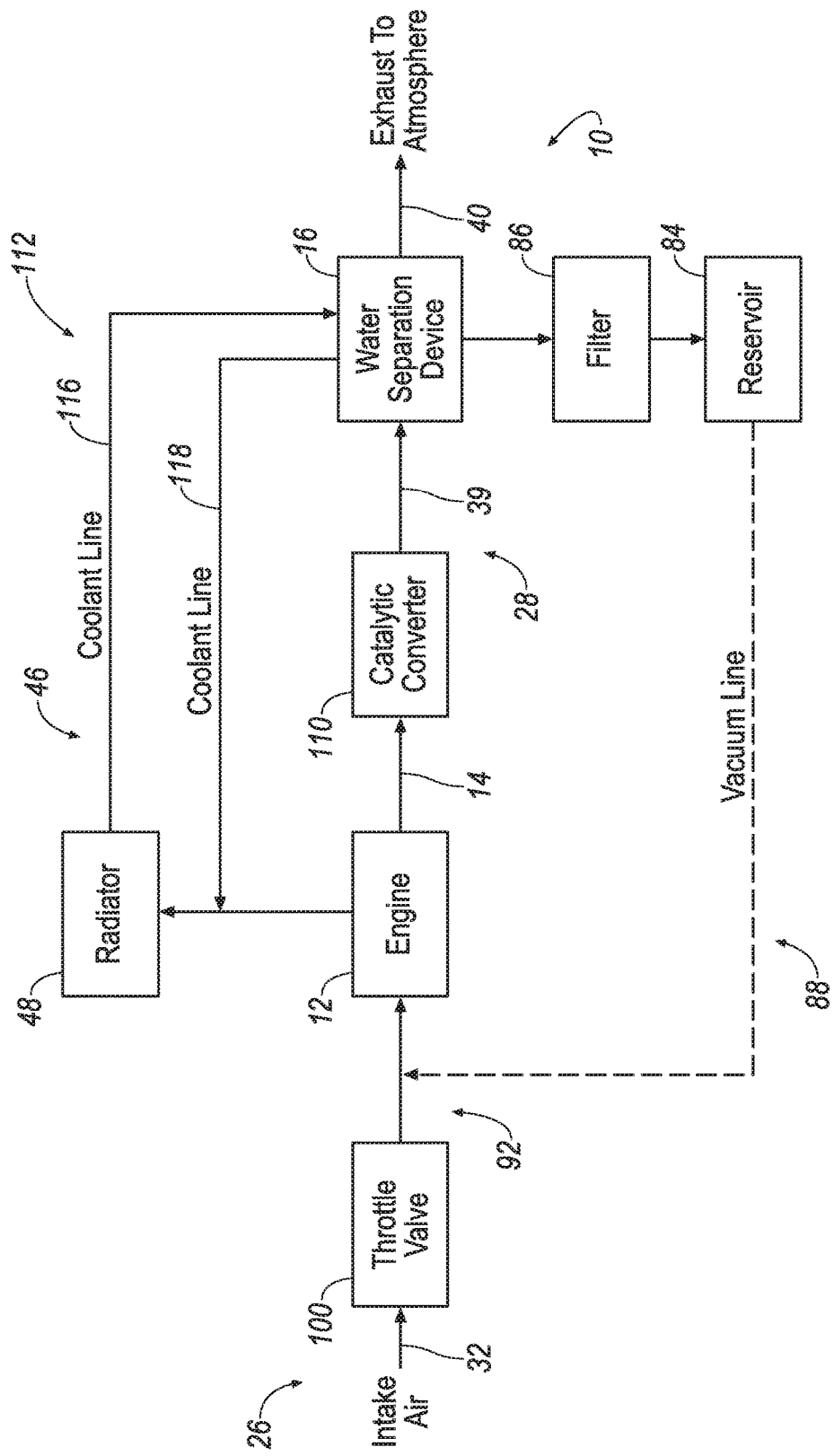
FIG. 8 is a schematic of another example system including the water separation device.

As set forth further below, during operation of the engine 12, the engine 12 emits exhaust gas, directly or indirectly through intermediate components, to the exhaust conduit 14. The exhaust conduit 14 may be directly connected to the water separation device 16, as shown in FIG. 8, or may be indirectly connected to the water separation device 16, as shown in FIGS. 6 and 7. In any event, the exhaust conduit 14 delivers exhaust gas (either pure exhaust gas or exhaust gas mixed with other gas, e.g., intake air) to the water separation device 16. The exhaust gas flows through the exhaust conduit 14 to the water separation device 16, and flows through the water separation device 16. The water separation device 16 separates water vapor (i.e., $H_2O$ vapor) from the exhaust gas, and condenses the water vapor into liquid water. Specifically, the water separation device 16 separates the exhaust gas into a water-rich permeate and a water-deficient retentate. The water-rich permeate may be withdrawn from the water separation device 16 and, for example, stored for potable uses and/or re-used in operation of the engine 12. The water-deficient retentate, i.e., the remaining exhaust gas, is passed through the water separation device 16 and exit the exhaust gas passageways 18 into a downstream conduit 40 to be, for example, exhausted into the surrounding atmosphere and/or recirculated to the engine 12. While only a single water separation device 16 is shown in the examples in the figures, the system 10 may include any suitable number of water separation devices 16, i.e., one or more. In examples where the system 10 includes more than one water separation device 16, the water separation devices 16 may be at various locations in communication with the exhaust conduit 14.

The engine 12, for example, may be an internal combustion engine, such as a gasoline engine or a diesel engine. The engine 12 may be used in vehicles such as passenger automobiles, trucks, buses, boats, ships, planes, helicopters, etc. As another example, the engine 12 may be used in a stationary application or any other suitable application. The exhaust gas emitted from the engine 12 may include $NO_x$, $SO_x$, $CO_2$, water vapor, etc.

The system 10 includes an intake system 28 for feeding combustion gas to the engine 12, and an exhaust system 28 for exhausting exhaust gases from the engine 12. The intake system 28 draws in intake air from the atmospheric, and mixes fuel with the intake air to form a combustion gas. The fuel may be, for example, gasoline, diesel, ethanol, etc. The engine 12 may be naturally aspirated (e.g., as shown in FIGS. 7 and 8), turbocharged (e.g., as shown in FIG. 6), supercharged, etc. As one example, with reference to FIG. 6, the system 10 may include a turbocharger 30 connected to the engine 12. The intake system 28 includes an intake conduit 32 in communication with the engine 12 for feeding intake air to the engine 12.

The turbocharger 30 includes a turbine 34 and a compressor 36 driven by the turbine 34, as is known. The turbine 34 is in communication with the exhaust system 28, e.g., the exhaust conduit 14, and is driven by exhaust gases exiting the engine 12 during operation of the engine 12. The compressor 36 is in communication with the intake system 28, and more specifically, the intake conduit 32, to deliver intake air to the compressor 36. As the turbine 34 is driven by the exhaust gas, the turbine 34 drives the compressor 36 to compress the intake air to feed compressed intake air to the engine 12. In an example where the system 10 includes the turbocharger 30, for example, as shown in FIG. 6, the system 10 may include a charge air cooler 38 between the compressor 36 and the engine 12 to cool the compressed intake air before introduction to the engine 12.

The exhaust system 28 includes the exhaust conduit 14. The exhaust conduit 14 is upstream of the water separation device 16, i.e., between the engine 12 and the water separation device 16. The exhaust system 28 may include the downstream conduit 40 downstream of the water separation device 16. The terms "upstream" and "downstream" are used throughout this document with reference to the flow of exhaust gas from the engine 12 through the exhaust system 28. The exhaust system 28 may have any suitable number of manifolds, conduits, paths, circuits, etc. As one example, as set forth further below, the exhaust system 28 may include an exhaust gas recirculation (EGR) circuit 42, as shown in FIGS. 6 and 7 and described further below. The EGR circuit 42 recirculates a portion of the exhaust gases back to the engine 12, and allows a portion the exhaust gases to flow downstream to be exhausted to the atmosphere. Specifically, the EGR circuit 42 extends from the exhaust conduit 14 to the intake conduit 32. The EGR circuit 42 may include an EGR cooler 44 (i.e., an exhaust gas cooler in the EGR circuit 42) to cool the recirculated exhaust gas before introduction to the engine 12.

The system 10 may include a cooling system 46 in fluid communication with the engine 12. The cooling system 46 may deliver coolant to the engine 12 to cool the engine 12, as is known. The cooling system 46 may include a radiator 48 for removing heat from the coolant. The coolant may be, for example, antifreeze, such as a mixture of propylene glycol and water.

The water separation device 16 may be in communication with a cooling device to cool the exhaust gas and/or the water separation device 16. As one example, the cooling device may be in the exhaust system 28 upstream of the water separation device 16 and in communication with the exhaust gas to cool the exhaust gas before the exhaust gas enters the water separation device 16. In other words, the cooling device may be between the engine 12 and the water separation device 16. As one example, in an example where the system 10 includes a turbocharger 30 and an EGR circuit 42, the charge air cooler 38 may be the cooling device. Specifically, the water separation device 16 may be disposed between the charge air cooler 38 and the engine 12, i.e., downstream of the charge air cooler 38 and upstream of the engine 12, as shown in FIG. 6. In this example, heat from the exhaust gas from the EGR circuit 42, and heat from the compression of the air by the compressor 36, is removed from the air by the charge air cooler 38 upstream of the water separation device 16. As another example, in an example, where the system 10 includes an EGR circuit 42, the cooling device may be the EGR cooler 44. In other words, the water separation device 16 may be downstream of the EGR cooler 44, as shown in FIG. 6.

As another example, the cooling device may be external to the exhaust system 28 and may cool the water separation device 16. For example, the cooling system 46 may be in communication with the water separation device 16 to cool the water separation device 16, as shown in FIG. 8 and described further below. In such an example, a component of the cooling system 46, e.g., the radiator 48, is the cooling device.

The system 10 includes an upstream conduit 39 directly upstream of the water separation device 16. The upstream conduit 39 may be a component of the exhaust system 28, e.g., the EGR circuit 42, as shown in FIGS. 6 and 7. As another example, the upstream conduit 39 may be a component of the intake system 28, as shown in FIG. 6. The downstream conduit 40 is directly downstream of the water separation device 16. As set forth below, the downstream conduit 40 may be a component of an exhaust system 28, as shown in FIGS. 7 and 8. As another example, the downstream conduit 40 may be a component of an intake system 28, as shown in FIG. 6.

Figure 2:
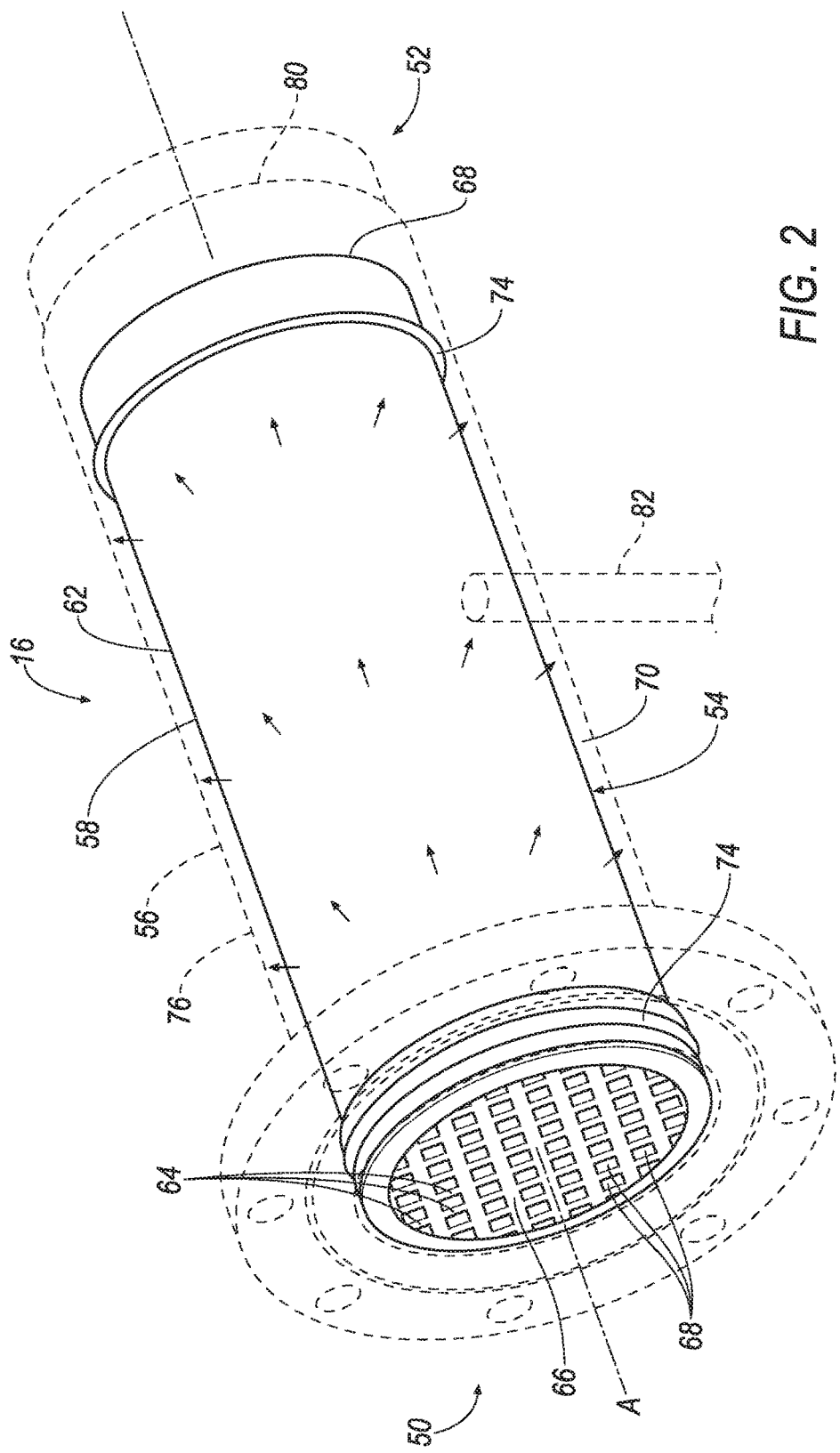
FIG. 2 is a perspective view of the water separation device with a module shown in solid lines and with a casing shown in hidden lines for illustrative purposes.

With reference to FIGS. 1 and 2, the water separation device 16 includes an inlet 50 and an outlet 52. The inlet 50 is in communication with the exhaust conduit 14 and the exhaust gas passageways 18, and the outlet 52 is in communication with the downstream conduit 40. In other words, the water separation device 16 is in-line with the exhaust conduit 14 and the downstream conduit 40. The exhaust gas flows from the engine 12, through the exhaust conduit 14 into the inlet 50 of the water separation device 16. As the exhaust gas flows into the inlet 50 of the water separation device 16, the exhaust gas flows into the exhaust gas passageways 18, and flows through the exhaust gas passageways 18 to the outlet 52, where the exhaust gas is exhausted to the downstream conduit 40.

The water separation device 16 includes a module 54 that includes the substrate 20 and the membrane 22 coated on at least a portion of the substrate 20. As set forth further below, the water separation device 16 includes a casing 56 that supports the module 54 and that collects water from the module 54. The casing 56 may define the inlet 50 and the outlet 52.

The module 54 may have an axis A extending through the inlet 50 and the outlet 52 of the water separation device 16. Each of the exhaust gas passageways 18 may extend along the axis A, e.g., may be parallel to the axis A. The substrate 20 may be elongated along the axis A.

The substrate 20 includes an outer wall 58 surrounding the exhaust gas passageways 18. The outer wall 58 has an inner surface 60 and an outer surface 62 concentric with the inner surface 60. The membrane 22 covers the inner surface 60, and the outer surface 62 is free of the membrane 22, i.e., the membrane 22 does not extend across the outer surface 62. The outer wall 58 may be elongated along the axis A. The outer wall 58 may be cylindrical, as shown in the figures, or may be of any suitable shape. In an example where the outer wall 58 is cylindrical and the water separate device is used downstream of an internal combustion engine 12, the outer wall 58 may have a diameter of 10-30 cm and may be 5-50 cm long along the axis A.

Figure 4:
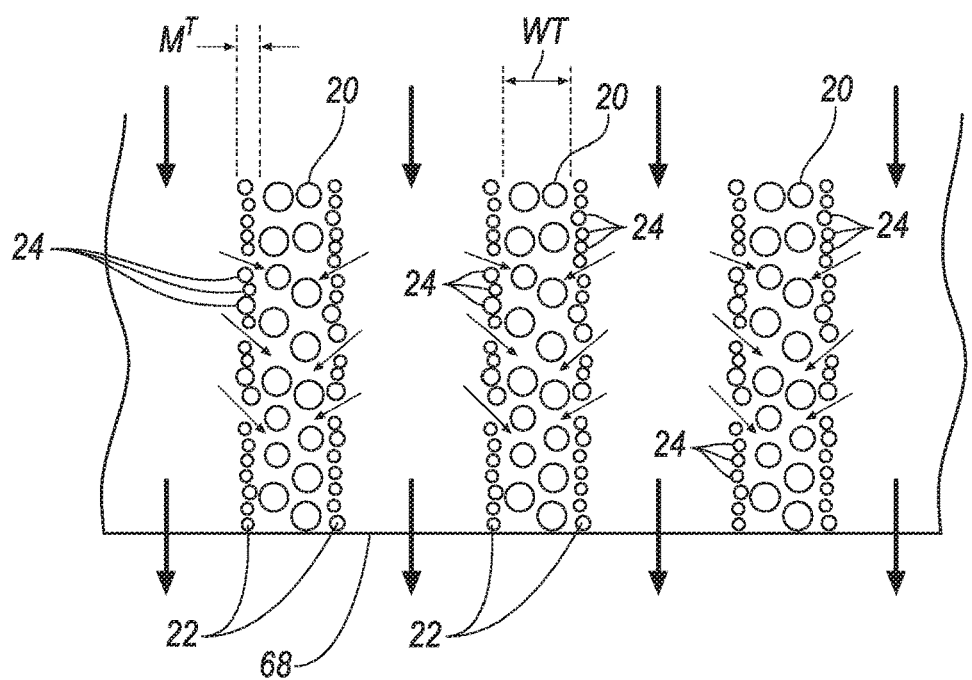
FIG. 4 is a cross-sectional view of a portion of the water separation device to show a substrate and a membrane of the water separation device.

The substrate 20 may include inner walls 64 surrounding the exhaust gas passageways 18. Each inner wall 64 is connected directly, or indirectly, to the outer wall 58 to transfer water from each of the inner walls 64 to the outer wall 58, as set forth further below. Specifically, at least some of the inner walls 64 extend from, i.e., directly from, the inner surface 60 of the outer wall 58. The inner walls 64 may each have a wall thickness WT of 0.02-2.0 mm. For example, the wall thickness WT may be between 0.05-0.5 mm. As another example, the wall thickness WT may be between 0.1-0.2 mm. The wall thickness WT is identified in FIG. 4. It should be appreciated that the wall thickness WT of the inner walls 46 of the substrate 20, and the membrane thickness MT of the membrane 22 shown in FIG. 4 are not drawn to scale relative to each other.

With reference to FIGS. 1 and 2, the substrate 20 includes an inlet end 66 and an outlet end 68. The inlet end 66 is in fluid communication with the inlet 50, and the outlet end 68 is in fluid communication with the outlet 52. The inlet end 66 is adjacent to the inlet 50 of the water separation device 16, and the outlet end 68 is adjacent to the outlet 52 of the water separation device 16, i.e., there is a lack of intermediate components between the inlet 50 and the inlet end 66 and between the outlet 52 and the outlet end 68. The inlet 50 may be at the inlet end 66, and the outlet 52 may be at the outlet end 68, i.e., with no space between the inlet 50 and the inlet 50 and with no space between the outlet 52 and the outlet end 68, as shown in FIG. 2.

The material of the substrate 20 may include a metal carbide. The metal carbide may be a mono-metal carbide or a multi-metal carbide. As one example, the substrate 20 may be silicon carbide. The material of the substrate 20 may be doped to achieve the desired thermal conductivity of the substrate 20. The material of the substrate 20 may be a ceramic. The substrate 20 may be porous, i.e., includes pores sized to allow liquid water to flow therethrough. Water flow through the substrate 20 is identified, for example, with arrows along the substrate in FIG. 3. The pores of the substrate 20 may be 0.5-50 μm. As set forth above, the substrate 20 is monolithic. In other words, substrate 20 is one piece. For example, the substrate 20 may formed as, and/or from, a single piece of material without seams or joints. As another example, the substrate 20 may be formed of several pieces that are separately formed and subsequently bonded together in any suitable fashion, e.g., with ceramic cement, to form the substrate 20. In such an example, material used to bond, e.g., the ceramic cement, may include a porous interface that does not significantly inhibit flow of water through the substrate 20, in particular across the interface at the bond.

Figure 5:
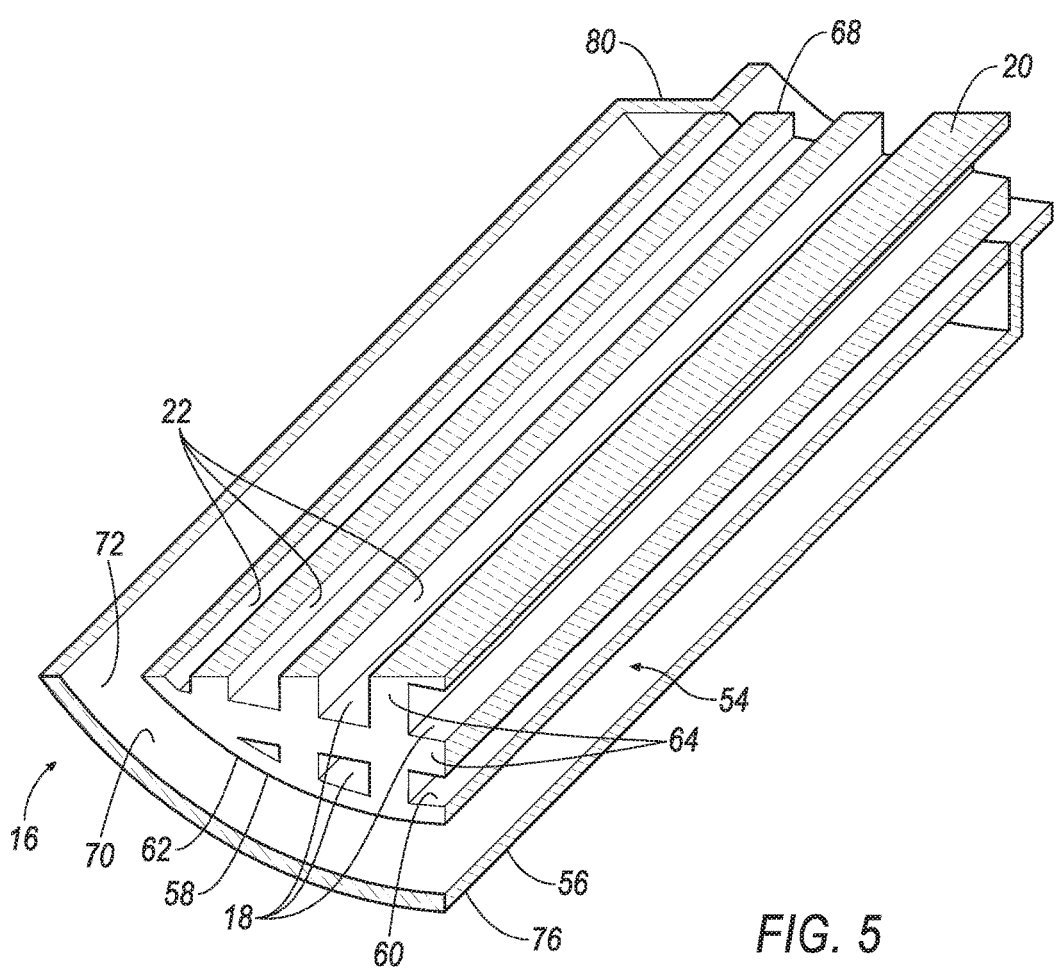
FIG. 5 is another cross-sectional view of the water separation device.

With reference to FIG. 5, each of the exhaust gas passageways 18 extends through the substrate 20. In other words, each of the exhaust gas passageways 18 extend continuously from the inlet end 66 to the outlet end 68, i.e., each exhaust gas passageway 18 has a path suitable for fluidly communicating the exhaust gas from the inlet end 66 to the outlet end 68. Accordingly, exhaust gas flows through the inlet 50 of the water separation device 16 into each exhaust gas passageway 18 at the inlet end 66, and flows through the exhaust gas passageways 18 to the outlet end 68 and the outlet 52 of the water separation device 16, where the exhaust gas flows into the downstream conduit 40. The inner walls 64 and the outer wall 58 of the substrate 20 enclose the exhaust gas passageways 18 from the inlet end 66 to the outlet end 68. This prevents the exhaust gas from exiting the exhaust gas passageways 18 at any location other than at the outlet end 68.

The exhaust gas passageways 18 may each be straight, as shown in FIG. 5. For example, the exhaust gas passageways 18 may be elongated along the axis A and may extend in parallel with the axis A. As another example, one or more of the exhaust gas passageways 18 may include bends, curves, etc. In any event, the exhaust gas passageways 18 each extend from the inlet end 66 to the outlet end 68.

Figure 3:
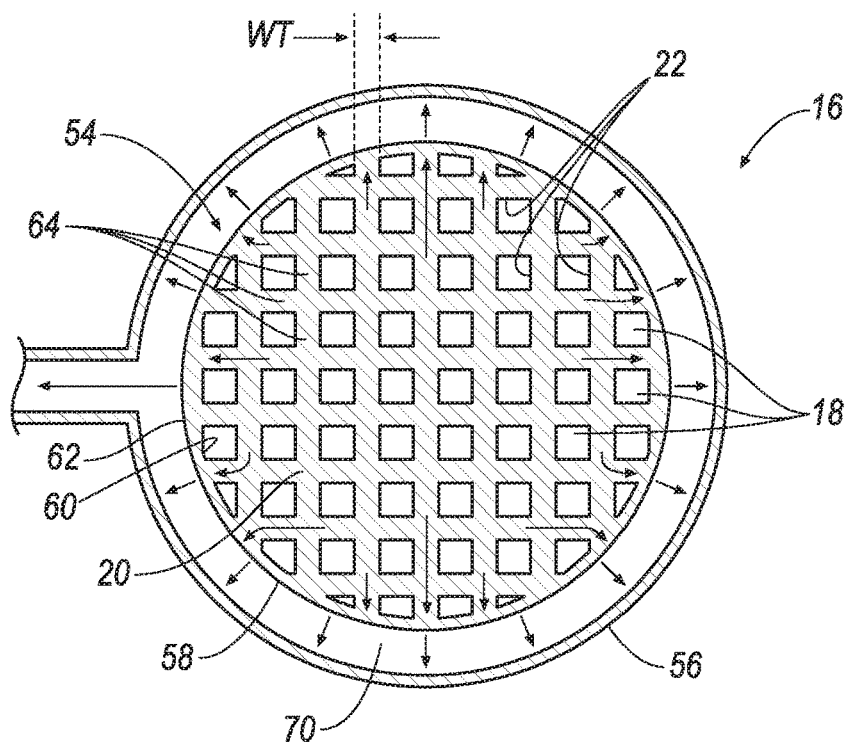
FIG. 3 is a cross-sectional view of the water separation device.

With reference to FIGS. 1-3, the exhaust gas passageways 18 may be arranged in a grid pattern. Specifically, the exhaust gas passageways 18 may be arranged in a repeating pattern. The exhaust gas passageways 18 may have a rectangular cross-section, e.g., a square cross-section as shown in FIGS. 1-3. In the example where the exhaust gas passageways 18 are square, the height and width of each exhaust gas passageway 18 may be, for example, 0.5-50.0 mm. For example, the height and width of each exhaust gas passageway 18 may be between 0.7-10 mm. As another example, the height and width of each exhaust gas passageway 18 may be between 1.0-5.0 mm. Alternatively, the exhaust gas passageways 18 may be of any suitable shape. One or more of the exhaust gas passageways 18 may have different shapes and/or sizes than others of the exhaust gas passageways 18. For example, some of the exhaust gas passageways 18, e.g., about 50%, may have a relatively smaller dimension, and the remaining exhaust gas passageways 18 may have a relatively larger dimension. The exhaust gas passageways 18 may be arranged in any suitable pattern. For example, the pattern may be based on manufacturing feasibility and/or performance of the water separation device 16.

With reference to FIGS. 4-5, the membrane 22 covers the inner walls 64 and the inner surface 60 of the outer wall 58 of the substrate 20. Specifically, the membrane 22 is layered on the surfaces of the inner walls 64 and the inner surface 60 of the outer wall 58. The membrane 22 covers each exhaust gas passageways 18 from the inlet end 66 to the outlet end 68, and is in contact with the exhaust gas as the exhaust gas flows through the exhaust gas passageways 18.

The membrane 22 may also be referred to as a condensation layer. With reference to FIG. 3, water vapor from the exhaust gas flowing through the exhaust gas passageways 18 enters the membrane 22, and, by capillary condensation, the water vapor condenses into liquid water in the membrane 22. The liquid water passes to the substrate 20 and is subsequently drawn from the substrate 20, as identified with arrows in FIG. 3.

The membrane 22 may have a thickness MT of 0.01-1000 μm. The thickness MT of the membrane 22 is identified in FIG. 4.

With continued reference to FIG. 4, the membrane 22 is porous. Specifically, as set forth above, the membrane 22 has capillary condensation pores 24. The water vapor from the exhaust gas enters the capillary condensation pores 24 and condense by capillary condensation. After condensation, the liquid water flows through the remainder of the capillary condensation pore 24 to the substrate 20.

The capillary condensation pores 24 are designed for capillary condensation of water vapor, i.e., the capillary condensation pores 24 are sized, shaped, positioned, etc., for capillary condensation of water vapor from the exhaust gases flowing through the exhaust gas passageways 18. The capillary condensation pores 24 may also be designed to allow the remaining components of the exhaust gas, e.g., $NO_x$, $SO_x$, $CO_2$, to remain in the exhaust gas passageways 18 and out of the capillary condensation pores 24. Specifically, the capillary condensation pores 24 are sized to allow for capillary condensation, and when capillary condensation occurs, condensed water in the capillary condensation pores 24 fills the capillary condensation pores and prevents exhaust gas from flowing through the capillary condensation pores 24. The capillary condensation pores 24 may have a pore size of less than 20 nm. For example, the capillary condensation pores 24 may have a pore size of less than 10 nm. Specifically, for example, the capillary condensation pores 24 may have a pore size of 2-4 nm. It should be appreciated that not all of the capillary condensation pores 24 have an identical size and shape. The term "pore size" with reference to the capillary condensation pores 24 refers to an average diameter of the capillary condensation pores 24. More specifically, there will be a pore size distribution, and the term "pore size" may refer to the mean or median of the distribution.

The material of the membrane 22 may be a ceramic. The material of the membrane 22 may include a metal oxide. Specifically, the material of the membrane 22 may be a porous metal oxide. For example, the material of the membrane 22 may include alumina, silica, titania, and/or silicon carbide.

During operation of the engine 12, the engine 12 exhausts exhaust gas to the exhaust conduit 14. This exhaust gas enters the inlet 50 of the water separation device 16 from the exhaust conduit 14, and the exhaust gas flows through the exhaust gas passageways 18 to the outlet 52 of the water separation device 16 and the downstream conduit 40. Specifically, while the exhaust gas flows through the exhaust gas passageways 18, water vapor from the exhaust gas enters the capillary condensation pores 24 of the membrane 22, as schematically shown in FIG. 4. As the water vapor moves through the capillary condensation pores 24, the water vapor condenses to liquid water. The liquid water flows to the substrate 20, and flows through the substrate 20. Specifically, as set forth further below, the liquid water may be drawn through the walls of the substrate 20 and through the outer surface 62 of the outer wall 58, as shown with arrows in FIG. 3, and may be captured for use. As set forth further below, the outer wall 58 of the substrate 20 may be placed under vacuum to draw the water vapor into the capillary condensation pores 24, and to draw the water from the substrate 20. The remaining water-deficient exhaust gas is exhausted from the exhaust gas passageways 18 at the outlet end 68 of the substrate 20 to the downstream conduit 40.

The module 54, i.e., the substrate 20 and the membrane 22, has a surface area to volume ratio of greater than 5 cm$^{-1}$. For example, the surface area to volume ratio may be greater than 10 cm$^{-1}$. As another example, the surface area to volume ratio may be greater than 20 cm$^{-1}$.

The material of at least one of the substrate 20 and the membrane 22 has a thermal conductivity greater than 60 W/m-K between 0° C. and 100° C. As one example, the material of the module 54, i.e., both the substrate 20 and the membrane 22, may have a thermal conductivity greater than 60 W/m-K between 0° C. and 100° C. This high thermal conductivity results in less material being required to maintain the substrate 20 at a sufficiently low temperature appropriate for capillary condensation in high-temperature locations of the exhaust conduit 14 downstream of the engine 12. Specifically, this thermal conductivity allows heat transfer throughout the volume of the substrate 20, which enables a more uniform temperature, i.e., a smaller temperature gradient, and more efficient cooling. This, in turn, allows an increase in surface area to volume ratio of the module 54. For example, this allows for the module 54 to have a surface area to volume ratio greater than 5 cm$^{-1}$ (and in other examples, greater than 10 cm$^{-1}$ or greater than 20 cm$^{-1}$) and effectively conduct capillary condensation in high-temperature locations of the exhaust conduit 14 downstream of the engine 12. This increase in surface area to volume ratio reduces the overall size of the module 54, which reduces packaging restraints and reduces manufacturing costs.

With reference to FIGS. 1-3 and 5, the casing 56 surrounds the outer wall 58. As shown in FIGS. 3 and 5, the casing 56 defines a water collection space 70 between the casing 56 and the outer wall 58. The water collected in the substrate 20 by capillary condensation through membrane 22 is collected in the water collection space 70.

The casing 56 includes a bore 72 that receives the module 54. The bore 72 may match the shape of the module 54, or may have any other suitable shape. For example, as shown in FIGS. 1-3, the bore 72 may be cylindrical to receive a cylindrical module 54.

The casing 56 and/or the module 54 includes seals 74 to seal the outer surface 62 of the outer wall 58 of the substrate 20 to the bore 72. The seals 74 prevent exhaust gases from entering the water collection space 70 to avoid contamination of the collected water, and the seals 74 retain the water in the water collection space 70, i.e., prevent water from escaping the water collection space 70. As set forth above, the water collection space 70 may also be separated from the exhaust gas passageways 18 by the substrate 20. Specifically, the inner walls 64 and the outer wall 58 of the module 54 prevent exhaust gases from entering the water collection space 70 because the exhaust gas passageways 18 extend continuously from the inlet end 66 to the outlet end 68. Accordingly, no exhaust gas reaches the water collection space 70.

As shown in FIGS. 1 and 2, the water separation device 16 includes two seals 74, one at the inlet end 66 and one at the inlet end 66. The seals 74 may be formed of any suitable material and may have any suitable size and shape to seal between the casing 56 and the module 54 to prevent exhaust gas and water from traveling therebetween. As one example, as shown in FIGS. 1 and 2, the seals 74 may be fixed to the module 54 such that the module 54 and the seals 74 are a unit. Alternatively, or in addition, seals 74 may be fixed to the casing 56, e.g., in the bore 72.

The casing 56 may include any suitable number of components. For example, as shown in FIGS. 1 and 2, the casing 56 may include a body 76 receiving the module 54, and a cap 78 engageable with the body 76 to retain the module 54 in the bore 72. The body 76 may include a flange 80 at the outlet 52 to retain the module 54 in the body 76 at the outlet 52. The casing 56 may be of any suitable material, e.g., stainless steel, aluminum, plastic, etc.

The water separation device 16 includes a tube 82 in communication with the water collection space 70. Water may be drawn from the water collection space 70 through the tube 82, as set forth further below. The tube 82 may be of any suitable size, shape, and material.

The water may be drawn from the water collection space 70 for, for example, potable uses. In such an example, the system 10 may include a reservoir 84 in communication with the water separation device 16. In particular, the reservoir 84 may be in communication with the water collection space 70 for storing the water drawn from the water collection space 70. The system 10 may include a filter 86 between the water separation device 16 and the reservoir 84. The filter 86 may filter contaminants from the water that may be present from the exhaust gas. The filter 86 may be a bed of adsorbent material to adsorb, for example, aqueous ions in solution to adjust the pH of the water. An example of the reservoir 84 is shown in FIG. 8.

As another example, the water from the water separation device 16 may be injected into the intake system 28 upstream of the engine 12 to modify the combustion process of the engine 12 and improve performance, e.g., knock suppression and reduction of $NO_x$ emissions. In this example, the water may be directly withdrawn from the water collection space 70 to be injected into the intake system 28, or the water may be stored in a reservoir 84 for subsequent injection into the intake system 28 on an as-needed basis. In such examples, the system 10 may include a water injection circuit 88 in communication with the intake system 28. Examples of the water injection circuit 88 are shown in FIGS. 6 and 7. The water injection circuit 88 may include a water pump 90, shown in FIGS. 6 and 7, for example, to pump the water from the reservoir 84 to the intake system 28.

The system 10 may include a vacuum source 92 in communication with the outer wall 58 of the substrate 20. For example, the vacuum source 92 may be in communication with the water collection space 70. The vacuum source 92 draws water from the water collection space 70. The vacuum source 92 also draws water from the inner walls 64 and the outer wall 58 of the substrate 20, and draws water vapor from the exhaust gas passageways 18 into the capillary condensation pores 24 of the membrane 22.

The vacuum source 92 may be, for example, a tube, i.e., a vacuum line, extending from the water collection space 70 to the intake system 28, which has a negative pressure during operation of the engine 12. Examples of this configuration are shown in FIGS. 6-8. As another example, the vacuum source 92 may be a vacuum pump, e.g., powered by the vehicle.

The system 10 may include a pressure source 94 in communication with the outer wall 58 of the substrate 20. For example, the pressure source 94 may be in communication with the water collection space 70. The pressure source 94 may be selectively operated to apply positive pressure the outer wall 58 of the substrate 20 to introduce pressure spikes back through the inner walls 64 and the membrane 22 into the exhaust gas passageways 18. This positive pressure may dislodge adsorbed particulates or other foreign material in contact with the membrane 22.

The positive pressure source 94 may be, for example, a pump. The positive pressure source 94 may be operated on a periodic basis as a preventative maintenance process to maintain maximum performance of the membrane 22.

Figure 10:
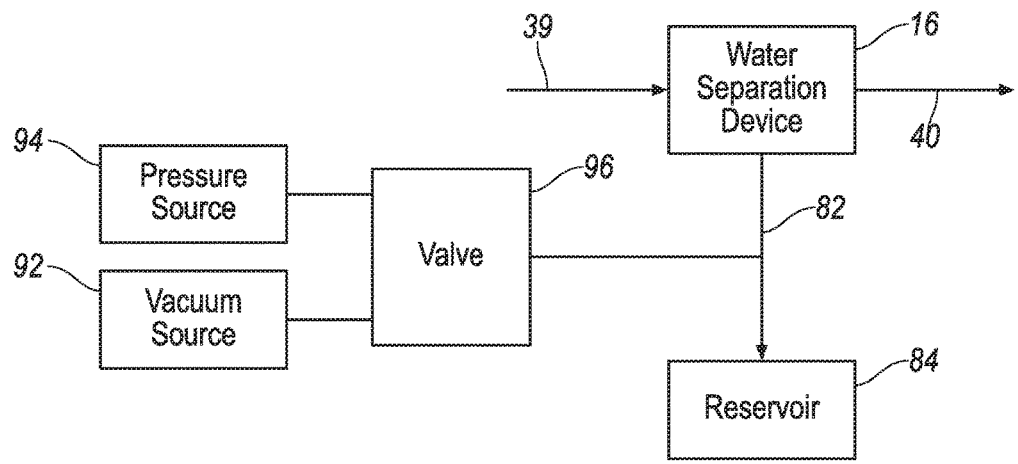
FIG. 10 is a schematic of a portion of a system including the water separation device selectively exposed to a pressure source and a vacuum source.

An example of the pressure source 94, i.e., a positive pressure source, is shown in FIG. 10. The pressure source 94 may be connected to water collection space 70 through the tube 82, as shown in FIG. 10. As another example, the pressure source 94 may be connected to the water collection space 70 through another tube, or in any other suitable fashion. In the example where the pressure source 94 is connected to the water collection space 70 through the tube 82, the system 10 may include a valve 96 between the water collection space 70 and the pressure source 94. The vacuum source 92 may also be connected to the valve 96. The valve 96 may alternately connect the pressure source 94 and the vacuum source 92 with the tube 82. In other words, the valve 96 may move from a vacuum position, in which the vacuum source 92 is connected to the tube 82, and a pressure position, in which the pressure source 94 is connected to the tube 82.

Figure 11:
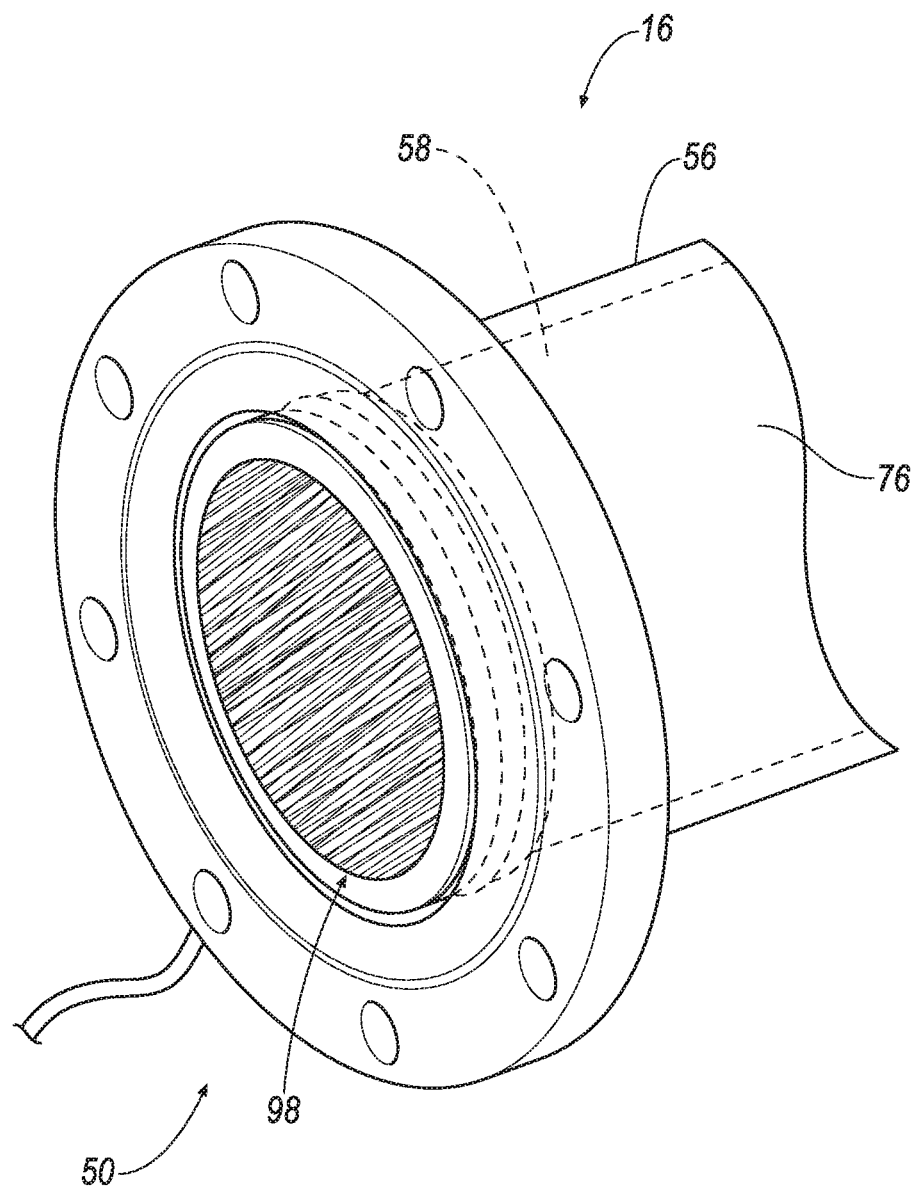
FIG. 11 is a perspective view of a portion of the water separation device and an inlet filter upstream of the water separation device for filtering gas entering the water separation device.

The system 10 may include an intake filter 98 at, or upstream of, the inlet 50 of the water separation device 16. An example, of the intake filter 98 is shown in FIG. 11. The intake filter 98 may be, for example, a particulate filter, such as a gasoline particulate filter. As another example, as shown in FIG. 11, the system 10 may include a heating element (not numbered) incorporated in the intake filter 98. The heating element may be continuously operated or periodically operated to heat the filter to oxidize soot accumulated on the filter. The heating element may be of any suitable type, such as an electric heating element (as shown in FIG. 11, and as indicated by the electric lead extending from the filter), hydrocarbon dosing to facilitate exotherm generation via fuel combustion, etc.

In addition to, or in the alternative to, the heating element incorporated into the intake filter 98, the system 10 may include a heating element that directly heats the substrate 20 to oxidize soot accumulated on the substrate 20 without affecting the seals 74. In such an example, the heating element, for example, may be an electric heating jacket between the casing 56 and the substrate 20, e.g., in the water collection space 70. In the example where the heating element directly heats the substrate 20 and the substrate 20 is externally cooled, e.g., with a cooling circuit 112 as described below, the heating element and the cooling may be alternately operated.

Three example embodiments of the system 10 are shown in FIGS. 6-8, respectively. Common numerals are used to identify common features in FIGS. 6-8. The varying features of FIGS. 6-8 may be used in any suitable combination with each other.

FIG. 6 shows an example of a system 10 including a turbocharger 30 for forced induction of the engine 12 (an internal combustion engine 12 in this example), and including the EGR circuit 42. In this configuration, the water separation device 16 may be downstream of the charge air cooler 38 to provide cooled gas to the water separation device 16. Specifically, the water separation device 16 is in communication with the intake conduit 32 between the charge air cooler 38 and the engine 12. The water separation device 16, specifically, is in communication with the intake conduit 32, and with the EGR circuit 42 through the intake conduit 32. Accordingly, when the EGR circuit 42 is operational, a mixture of intake air and exhaust gas enter the water separation device 16. For example, the intake air/exhaust gas mixture entering the water separation device 16 after the charge air cooler 38 may be between 1 and 100° C. In this example shown in FIG. 6, water is collected in the reservoir 84 for reintroduction into the intake system 28 upstream of the engine 12 to improve emissions of the engine 12.

With continued reference to FIG. 6, intake air is drawn into the intake system 28. The system 10 includes a throttle valve 100 for controlling the volume of intake air. The intake air flows through a Venturi mixer 102 to the compressor 36, where the intake air is compressed and forced through the charge air cooler 38 to cool the compressed intake air. This cooled, compressed intake air then flows through the water separation device 16. A throttle valve 104 meters the flow of the intake air from the charge air cooler 38 and the water separation device 16 to the engine 12. Exhaust gas from the engine 12 turns the turbine 34 and is exhausted from the turbine 34 to the remainder of the exhaust system 28. A portion of the exhaust gas is exhausted to atmosphere, and a portion of the exhaust gas enters the EGR circuit 42.

The exhaust gas in the EGR circuit 42 flows through the EGR cooler 44 to cool the exhaust gas. An EGR valve 106 is disposed between the EGR cooler 44 and the Venturi mixer 102 to control flow of exhaust gas through the EGR circuit 42. When the EGR valve 106 is open, exhaust gas is drawn through the EGR circuit 42 by vacuum created in the Venturi mixer 102 to introduce the exhaust gas to the intake system 28. When the EGR valve 106 is open, a mixture of intake air and exhaust gas flows to the compressor 36. This intake air/exhaust gas mixture is compressed by the compressor 36 and fed to the charge air cooler 38 and the water separation device 16. The water separation device 16 separates and condenses water vapor from the intake air/exhaust gas mixture.

In FIG. 7, the system 10 includes the EGR circuit 42, and the water separation device 16 is disposed along the EGR circuit 42. Specifically, the EGR circuit 42 includes an EGR cooler 44, and the water separation device 16 is disposed in the EGR circuit 42 between the EGR cooler 44 and the intake conduit 32.

In FIG. 8, the exhaust system 28 includes a catalytic converter 110 in the exhaust conduit 14. The water separation device 16 is in the exhaust system 28 downstream of the catalytic converter 110. In other words, the catalytic converter 110 in the exhaust conduit 14 between the water separation device 16 and the engine 12.

Figure 9:
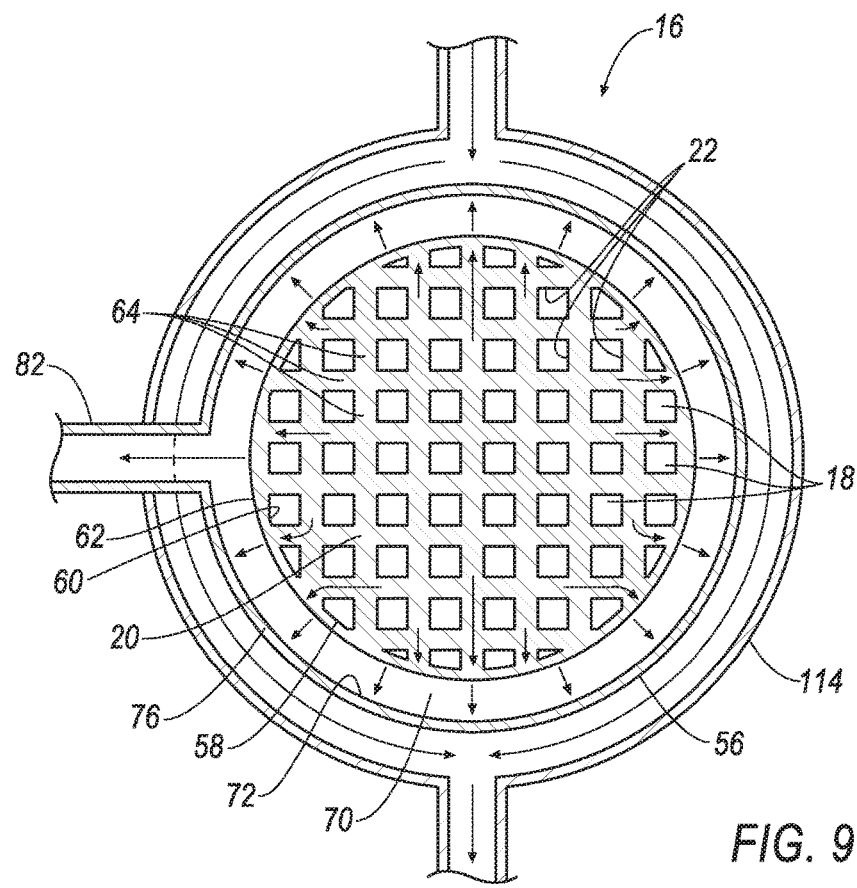
FIG. 9 is a cross-sectional view of an example of the water separation device of FIG. 8.

In this example where the water separation device 16 is downstream of the catalytic converter 110, the water separation device 16 may be externally cooled. For example, as shown in FIG. 8, the cooling system 46 includes a cooling circuit 112 in communication with the water separation device 16 to cool the water separation device 16. For example, as shown in FIG. 9, the water separation device 16 may include a housing 114 surrounding the casing 56. The housing 114 is in communication with the cooling system 46 to move coolant over the water separation device 16. Specifically, the housing 114 defines a coolant path between the housing 114 and the casing 56, and the coolant path is in fluid communication with the cooling system 46.

With continued reference to FIGS. 8 and 9, the cooling system 46 may include a radiator 48 for cooling the coolant after the coolant flows through the engine 12. A coolant line 116 connects the radiator 48 with the water separation device 16, e.g., the coolant path of the housing, to deliver cooled coolant from the radiator 48 to the water separation device 16 to cool the water separation device 16. Another coolant line 118 delivers the coolant to the remainder of the cooling system 46.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
   an engine;
   an exhaust conduit in communication with the engine; and
   a water separation device having exhaust gas passageways in communication with the exhaust conduit;
   the water separation device having a substrate and a membrane on the substrate, the substrate being monolithic and extending around the exhaust gas passageways, and the membrane being between the exhaust gas passageways and the substrate and having capillary condensation pores extending from the exhaust gas passageways to the substrate;
   wherein the substrate includes an outer wall surrounding the exhaust gas passageways, and the water separation device includes a casing surrounding the outer wall and defining a water collection space between the casing and the outer wall, the water collection space being separated from the exhaust gas passageways by the substrate.

2. The system of claim 1, wherein the substrate and membrane have a surface area to volume ratio greater than 5 cm−1.

3. The system of claim 1, wherein the material of at least one of the substrate and the membrane has a thermal conductivity greater than 60 W/m-K between 0° C. and 100° C.

4. The system of claim 1, further comprising a vacuum source in communication with the water collection space.

5. The system of claim 1, further comprising a pressure source in communication with the water collection space.

6. The system of claim 1, wherein the outer wall is elongated along an axis, and wherein the exhaust gas passageways are each elongated along the axis.

7. The system of claim 1, further comprising a cooling system, wherein the water separation device includes a housing surrounding the casing, the housing defining a coolant path between the housing and the casing, the coolant path being in fluid communication with the cooling system.

8. The system of claim 7, wherein the cooling system is in fluid communication with the engine.

9. The system of claim 1, further comprising an intake conduit in communication with the engine, and an exhaust gas recirculation circuit extending from the exhaust conduit to the intake conduit, wherein the water separation device is disposed along the exhaust gas recirculation circuit.

10. The system of claim 9, wherein the exhaust gas recirculation circuit includes an exhaust gas cooler, and the water separation device is disposed in the exhaust gas recirculation circuit between the exhaust gas cooler and the intake conduit.

11. The system of claim 1, further comprising an intake conduit in communication with the engine, a compressor in communication with the intake conduit, and a water injection circuit in communication with the water separation device and the engine.

12. The system of claim 11, wherein the water injection circuit includes a water pump.

13. The system of claim 1, further comprising an intake conduit in communication with the engine, an exhaust gas recirculation circuit extending from the exhaust to the intake conduit, a compressor in communication with the intake conduit, and a charge air cooler between the compressor and the engine, the water separation device being in communication with the intake conduit between the charge air cooler and the engine.

14. The system of claim 1, further comprising a catalytic converter in the exhaust gas conduit between the water separation device and the engine, and a cooling system in communication with the engine, the cooling system including a cooling circuit in communication with the water separation device.

15. The system of claim 1, further comprising a cooling system in communication with the engine, the cooling system including a cooling circuit in communication with the water separation device.

16. The system of claim 1, further comprising a reservoir in communication with the water separation device, and a filter between the water separation device and the reservoir.

17. The system of claim 1, wherein the substrate includes metal carbide.

18. The system of claim 1, wherein the substrate is porous.

19. The system of claim 1, wherein the membrane includes metal oxide.

* * * * *